UNITED STATES PATENT OFFICE.

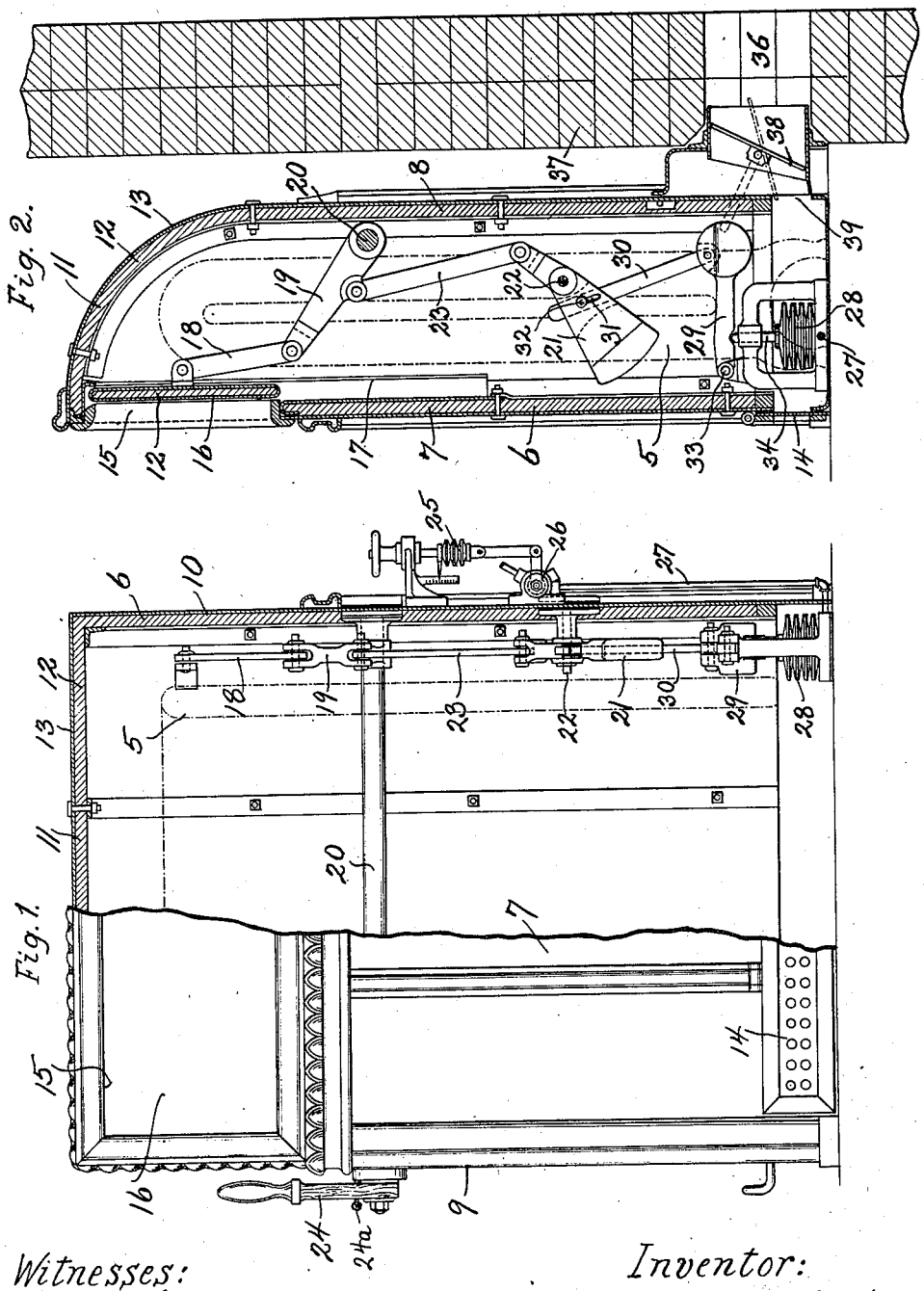

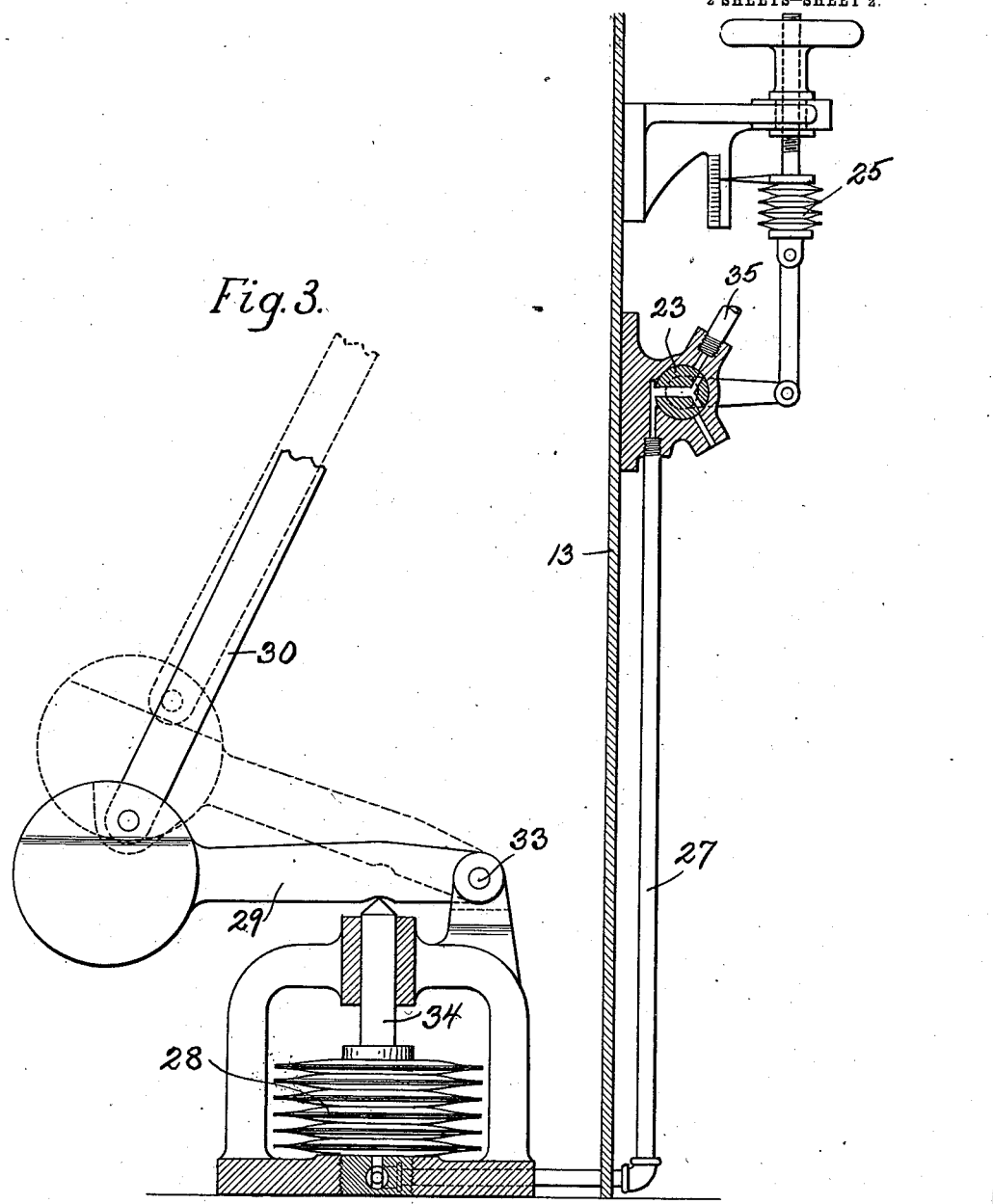

EDWARD H. MURPHY, OF CHICAGO, ILLINOIS.

HEAT-REGULATOR.

1,013,424.   Specification of Letters Patent.   Patented Jan. 2, 1912.

Application filed October 29, 1908. Serial No. 460,176.

*To all whom it may concern:*

Be it known that I, EDWARD H. MURPHY, a citizen of the United States, residing at Chicago, in the county of Cook and State of Illinois, have invented a new and useful Heat-Regulator, of which the following is a specification.

My invention relates to heat regulators in which the heater or radiator is inclosed in a casing made of non-heat-conducting material and means are provided whereby the air is permitted to circulate through said casing as required automatically, and the objects of my improvements are, first, to perfectly regulate the temperature in a room; second, to provide a sliding door counterweighted to normally close; third, to connect the air controlling door to a thermostat to be automatically moved thereby; fourth, to make a simple effective and durable device and other features to become apparent from the description to follow. In heat regulators of this class, the heater or radiator is kept continually hot and the air in the room is insulated from the same by a casing. When it is desired to heat the room a door in the casing is opened to permit the air to circulate through the casing and thus become heated. It is only necessary to have a door at the top of the casing to regulate the passage of air through the same; the lower part of the casing is left open. The door in the casing is preferably made to slide loosely in vertical guides and is so counter-weighted as to normally move to its upper closed position. A thermostat of any desired construction is placed near the heater or radiator and is operatively connected to a valve which controls pressure used to move the air controlling door down and up.

To describe my invention so that others versed in the art to which it pertains may make and use the same, I have illustrated it on the accompanying two sheets of drawings forming a part of this specification, in which—

Figure 1, is a front elevation partly in section of a heater embodying my invention; Fig. 2, is a vertical cross sectional view and Fig. 3, is an enlarged detail view of the door moving apparatus.

Similar reference characters refer to similar parts throughout the several views.

For the purpose of illustration the radiator 5 is shown by dotted lines. The casing 6 has the four vertical walls 7, 8, 9 and 10 and the top 11 which is preferably formed by the rear wall 8 being curved forward to meet the front wall 7. All the walls of the casing 6 are made of non-heat-conducting material 12 which may be covered by sheet metal 13. The front wall 7 is provided at the bottom with an opening or openings, as for example the perforated metal plate 14, to permit air to pass through and likewise is provided at the top with an opening 15 to permit air to pass through. It is evident that air will pass in at the bottom and will pass out through opening 15 when the radiator 5 is hot, the air being heated by the radiator in its passage upward through the casing 6.

To regulate the amount of heated air that passes out of the casing 6 a door 16 is provided to close the opening 15 more or less as required. The door 16 is mounted to slide freely in the vertical guide 17 and has pivotally attached to it a link 18 which has its remaining end pivoted to the free end of an arm 19 mounted on a rock-shaft 20 mounted in bearings on the walls 9 and 10. To counterbalance the weight of the door 16, I provide a weighted lever 21 pivoted at 22 to the wall 10, having its end connected by link 23 to arm 19 in such manner that the weighted lever 21 will normally hold the door 16 in its uppermost position as clearly shown in Fig. 2. One end of shaft 20 extends to the exterior of the casing 6 where it is provided with the hand operating lever 24 by means of which the door 16 can be moved up or down to any desired position, and be held in any position by means of the pin 24ª. The door 16 is also made of non-heat-conducting material 12, and the opening 15 may be provided with ornamental openwork to hide the door 16 from view and also to prevent careless tampering with the door.

To automatically move the door 16 up or down, I provide a thermostat 25 in any convenient place in the room and have its operating end connected to the handle of a three-way valve 26 which controls the inlet and outlet to the small pipe 27 which leads to the pressure motor 28 which in turn operates a lever 29 which is connected to the weighted lever 21 by the link 30. A certain amount of lost motion is provided for between lever 29 and lever 21, as by slotting the lever 21 at 31 wherein the pin 32 secured to link 30 is made to slide. The purpose of this lost motion is to permit the door 16 to be moved independent of the movement of lever 29. The lever 29 is pivoted at 33 and is arranged to be engaged by pin 34 of the pressure motor 28. The pressure motor 28 is built up of a multiple of diaphragms so that when steam or air pressure is admitted to the interior of the diaphragms through pipe 27 the aggregate amount of movement will be transmitted to the pin 34 and thence to the lever 29. A constant pressure is maintained in the pipe 35 leading to the valve 26 and the valve is so constructed that, when in the first of three positions the pipe 35 is communicatively connected with the pipe 27; when in the second of its three positions the entrance to pipe 27 is closed, and when in the third position the pipe 27 is communicatively connected to the outside atmosphere. Thus it will be seen that, when the thermostat 25 is made to move the handle of valve 26 upward as viewed in Figs. 1 and 3, by lack of heat in the room the valve 26 will be moved to its first position as above referred to and the door 16 will be moved down to open the passage 15; when the temperature of the room rises the thermostat 25 will move the handle of valve 26 downward and the valve will be moved to its second position as above referred to and the door 16 will remain stationary; and when the temperature of the room becomes excessive the thermostat 25 will act to move the handle of valve 26 still farther down to its third position as above referred to and the door 16 will be raised to close the opening 15. In this manner the temperature of the room is automatically regulated by the thermostat 25. The thermostat may be of any desired construction and is preferably provided with some means of adjustment in connection with a graduated scale whereby it may be set to retain the temperature of the room at any desired degree.

If desired a certain amount of the air, which is admitted into the bottom of the casing 6, can be let in through the opening 36 in wall 37 from the exterior of the building. The opening 36 is preferably controlled by a damper 38. The opening 36 is in direct communication with the opening 39 at the bottom of casing 6, preferably on the rear side thereof.

While I have shown and described the door 16 as being moved by a pressure motor 28 and this pressure motor operated by steam or air pressure controlled by a thermostat 25 it is possible to connect the thermostat itself directly to a multiple of levers to move the door 16 and thus discard the pressure motor.

By this system of regulation a considerable saving in fuel is obtained for the reason that there is very little condensation in the radiators and the radiators need not be reheated over and over.

It will be understood that the form, size, design and construction of the several parts may be materially changed without departing from the spirit of the invention.

Having thus fully described my invention what I claim as new and desire to secure by Letters Patent of the United States is:—

1. In a device of the class described, a heating radiator, a jacket inclosing said radiator provided with an opening at the top and an opening at the bottom, a vertically sliding door to close the said opening at the top counter-weighted to normally be in a closed position, thermostatic means to automatically operate said door and lost motion between the door and the thermostatic means so that the door may be moved independently of said means.

2. In a device of the class described, a heating radiator, a jacket inclosing said radiator provided with an opening at the top and an opening at the bottom, a door to close said opening at the top pivotally mounted on the free ends, a pair of pivoted arms and counter-weighted to normally be in a closed position, a rock shaft to which said two arms are rigidly secured extending outside the jacket, a handle secured to said shaft on the exterior of said jacket, thermostatic means connected to said shaft to automatically operate said door and lost motion between said shaft and said thermostatic means whereby the door can be moved independently of said means by manipulating said handle.

In testimony whereof I have signed my name to this specification in presence of two subscribing witnesses this 21st day of October, 1908, at Chicago, Illinois.

EDWARD H. MURPHY.

Witnesses:
MILTON C. LENOIR,
R. J. JACKER.